United States Patent [19]

Swan

[11] 4,079,799
[45] Mar. 21, 1978

[54] STEERING DRIVE AXLE ASSEMBLY

[75] Inventor: Terry D. Swan, Oakland, Calif.

[73] Assignee: International Harvester Company, Chicago, Ill.

[21] Appl. No.: 738,769

[22] Filed: Nov. 4, 1976

[51] Int. Cl.² ............................................. B60K 17/30
[52] U.S. Cl. .................................. 180/43 R; 180/48; 280/96.1
[58] Field of Search ................... 180/43 R, 45, 46, 48; 280/96.1, 96.3

[56] References Cited

U.S. PATENT DOCUMENTS

| 2,623,604 | 12/1952 | Keese | 180/43 |
| 3,254,670 | 5/1966 | Thomas et al. | 180/43 |

Primary Examiner—Joseph F. Peters, Jr.
Assistant Examiner—Donn McGiehan
Attorney, Agent, or Firm—John P. O'Brien; Floyd B. Harman

[57] ABSTRACT

The combination of wheel bearing spindle, steering knuckle and brake support assembly is formed from a one piece casting for use in a steerable driving axle. The wheel bearing spindle portion has a generally conical shape and an axial bore of a shape adapted to receive the driven axle. A brake support portion is integrally formed from the rear surface of the wheel bearing spindle portion and includes convex web member that carries a pair of diametrically opposite brake shoe mounting flanges which are closely spaced to the wheel bearing spindle portion. The steering knuckle portion is integrally formed with and extends rearwardly from the convex web member of the brake support portion and includes a pair of radial arm support members which are formed with radially extending openings contiguous to the rear surface of the brake support web member for seating a kingpin bearing. The arm support members of the steering knuckle portion each terminate with an end collar having an aperture formed therein for mounting a steering linkage rod.

5 Claims, 4 Drawing Figures

STEERING DRIVE AXLE ASSEMBLY

BACKGROUND OF THE INVENTION

This invention is an improvement over prior art steerable driving axles, as represented by U.S. Pat. Nos. 3,605,930; 3,472,331; 3,253,670; and 3,279,568. These prior art patents have the common disadvantage that the geometric relationship between the front wheel and kingpin produces a high scrub radius, resulting in great efforts required for steering. It is an object of this invention to reduce the scrub radius to one half as great as these prior art designs.

SUMMARY OF THE INVENTION

For use in a steerable driving axle the combination of a wheel bearing spindle, steering knuckle, and brake support assembly formed from a one piece casting such that the brake support portion is provided in a contiguous relation to the conically shaped wheel bearing spindle portion and the steering knuckle portion having a pair of radially extending arm members with a pair of kingpin bearing openings formed therein in contiguous relation to the brake support portion.

BRIEF DESCRIPTION OF THE DRAWINGS

For a better understanding of this invention, reference may be made to the accompanying drawings in which.

DESCRIPTION OF THE PREFERRED EMBODIMENT

Figure 1:
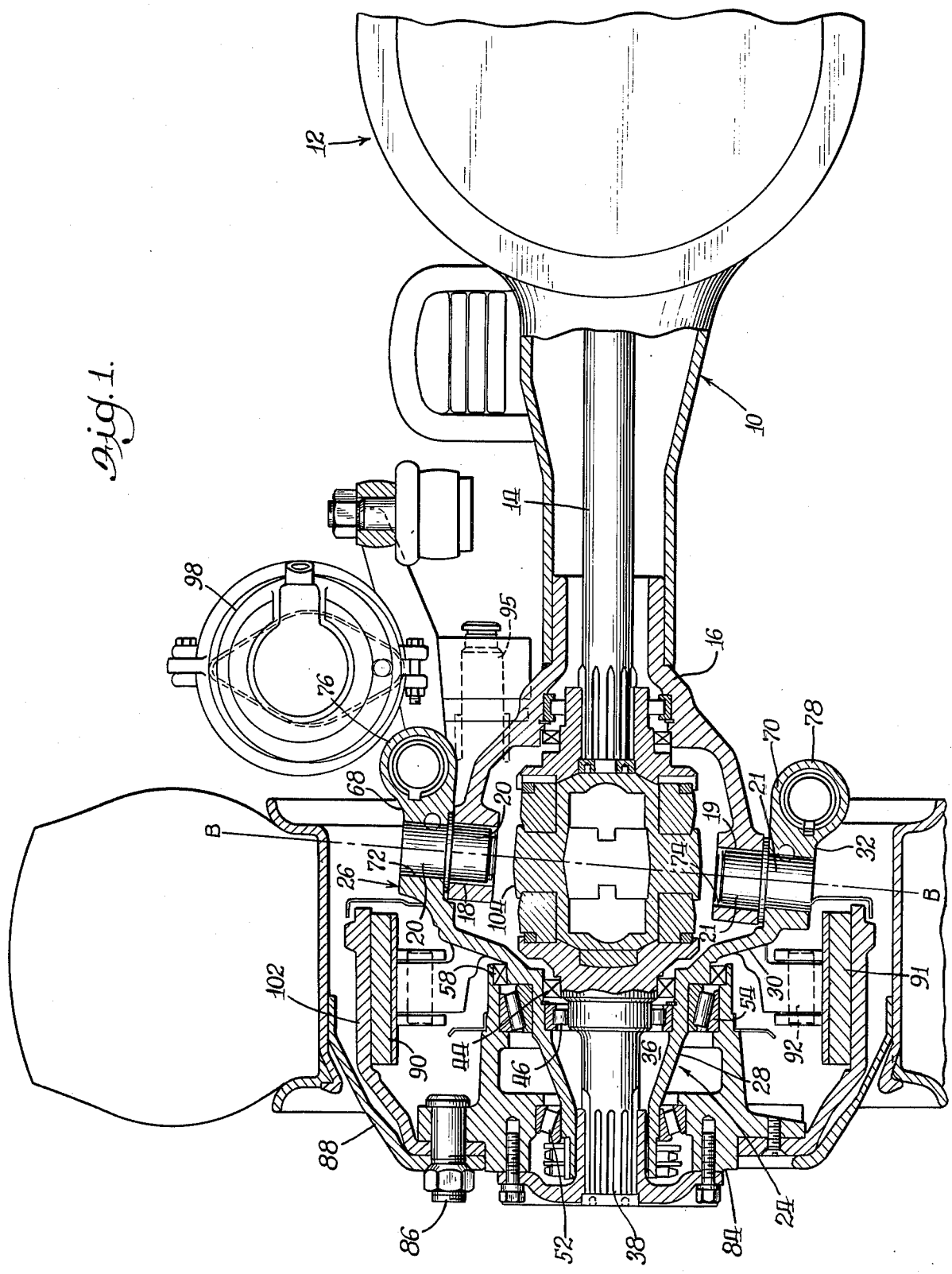
FIG. 1 is a view in vertical diametrical section of one end of a steering drive axle that embodies the preferred embodiment of this invention.

There is shown in FIG. 1, an axle housing 10 extending from differential housing 12 through which extends a driven axle 14. A suspension yoke 16 is secured to the outer end of axle housing 10 and is formed with a pair of radial apertures 18, 19 for receiving kingpins 20, 21.

Figure 2:
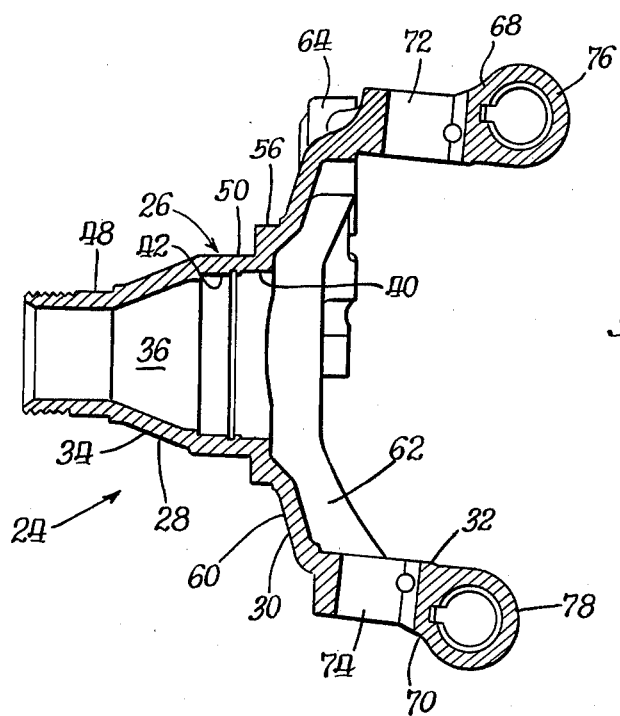
FIG. 2 is a view in vertical diametrical section of the preferred embodiment of this invention.
Figure 3:
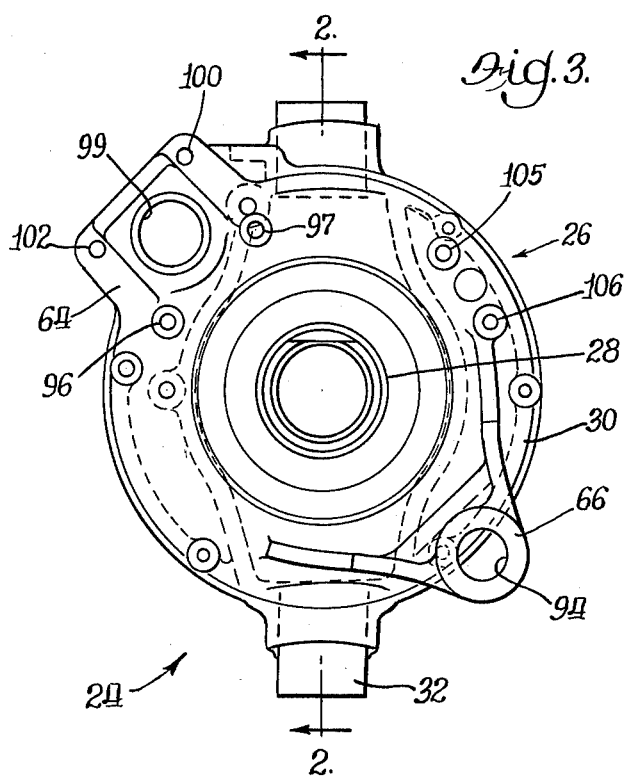
FIG. 3 is an end view of the preferred embodiment of this invention taken from the left side of FIG. 2.

A combined wheel bearing spindle, steering knuckle and brake support assembly, which embodies the principles of this invention and which is generally designated by the reference numeral 24, is pivotally connected to the suspension yoke 16 by means of kingpins 20, 21. As depicted in FIGS. 2 and 3, the combined wheel bearing spindle, steering knuckle and brake support assembly 24 is formed from a one-piece casting 26 into a wheel bearing spindle portion 28, a brake support portion 30, and a steering knuckle portion 32.

The wheel bearing spindle portion 28 comprises a generally conically shaped member 34 having an axle bore 36 for receiving the driven axle 38 (FIG. 1). At the rearward end of the conical member 34 there is provided a pair of internal stepped annular shoulders 40 and 42, respectively, for mounting a seal 44 and roller bearing 46 (FIG. 1). On the exterior surface of the wheel bearing spindle conical member 34 there is provided the external annular shoulders 48 and 50 at the forward and rearward ends thereof for seating roller bearings 52 and 54 respectively. Adjacent to the rearward annular shoulder 50 there is provided a stepped annular shoulder 56 for seating seal 58 as shown in FIG. 1.

The brake support portion 30 comprises a convex web member 60 extending rearwardly from and outwardly of the rearward end of conical shape member 34. The convex web member 60 has a central opening 62 concentric with axial bore 36 and a pair of diametrically opposite brake shoe mounting flanges 64 and 66 (FIG. 3) having their forward end faces lying in parallel planes that are perpendicular to the axial bore's axis.

The steering knuckle portion 32 comprises a pair of radial arm support members 68 and 70 extending rearwardly from the rear end surface of convex web member 60. The arm support members 68, 70 are formed, respectively, with radially extending openings 72 and 74 for seating the upper half of kingpins 20 and 21, as depicted in FIG. 1. At the end of the pair of arm support members 68 and 70, there is provided end collars 76 and 78. The end collars 76 and 78, respectively, have circular apertures 80 and 82 for receiving a steering linkage rod.

A wheel hub 84 is rotatably supported on the wheel bearing spindle portion 28 by means of bearings 52 and 54. A plurality of wheel lugs 86 are provided on the wheel hub 84 to support a rotatable wheel assembly 88.

A pair of brake shoes 90, 91 having identical configurations, are slidably disposed by mounting flanges 64 and 66. The shoes are pivotally mounted together at one end by an anchor pin 92 which is mounted through the circular opening 94 of mounting flange 66 (see FIG. 3). The free end of the brake shoes are urge towards an interposed S-shaped cam member by means of a pair of springs (not shown) that are stretched between the free ends of the brake shoes and the anchor bosses 96, 97, which extend outwardly of the mounting flange 64 (see FIG. 3). A conventional S-shaped cam member is mounted on a cam shaft 95 which extends through the aperture 99 (FIG. 3) of mounting flange 64 and is operated by a diaphram-type air actuator 98, that is secured to the rear surface of mounting flange 64 by means of threaded apertures 100 which are formed in the rear surface of mounting flange 64 (FIG. 3).

A brake drum 102 is attached to the wheel hub 84 in a conventional manner such that its inner circumferential surface is in a closely spaced concentric arrangement with the brake shoes 90, 91 to permit the expansive movement of the brake shoes to cause the frictional material on the brake shoes to impinge upon the internal periphery of the brake drum 102 in a conventional manner. The brake shoes are resiliently supported in place by means of a hold down spring device (not shown) that is mounted on a pair of spaced threaded bosses 105, 106 (FIG. 3).

The drive shaft 14 and driven shaft 38 are inner-connected in a conventional manner by a Cardan-type universal joint 104. Kingpins 20 and 21 rotationally connect the suspension yoke 16 to the one-piece casting 26. The axis of rotation for the kingpins 20, 21 is designated in FIG. 1 by the line B—B and this axis B—B passes through the center of rotation for universal joint 104.

Figure 4:
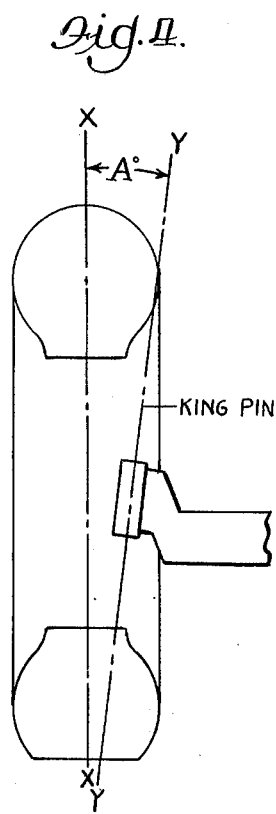
FIG. 4 is a sketch of the relationship between the kingpin axis and the vertical center line of the front wheel for a front axle.

One of the major advantages over prior art front driving axle designs is that this invention substantially reduces steering wheel effort without reducing the proper road feel and stability characteristics. These improved steerable characteristics can best be explained by referring to FIG. 4, wherein line Y—Y represents the center line of the kingpins and line X—X represents the vertical centerline of the front wheel. The angle between these two lines is called the kingpin inclination and is designated as "A" degrees. During a turn, the wheel rotates around the line Y—Y and in so doing, lifts the weight of the front axle. The amount the axle must be lifted is directly proportional to the angle A degrees.

For proper road feel during turns and straight away it is essential that there be a kingpin inclination for it assists the front wheels in returning to their straight-ahead position when coming out of a turn. Many years of experience, research and testing has determined that the optimum angle of inclination A to provide both the easy steering and a positive steering and roadability stability should be approximately 4°. Because of the distance between the kingpins and the vertical center line of the front wheel is so large in prior art steerable driving axle designs, it is impossible to obtain this optimum 4° angle of inclination in constructing a steerable driving axle using the teachings of the prior art. However, by using a one-piece casting to form the combined wheel bearing spindle, brake support and steering knuckle, in the manner described above, this invention permits the design of a steerable front drive axle having an angle of inclination of 4° and having the same steering geometry as a non-driving I-Beam front axle.

What is claimed is:

1. The combination of a wheel bearing spindle, steering knuckle and brake support assembly for a steerable driving axle, formed from a one-piece casting, comprising a wheel bearing spindle portion of a generally conical shaped member having: an axial bore of a shape adapted to receive the driven axle, a first annular shoulder at one end for receiving a first roller bearing and a reduced diameter annular shoulder at the other end for receiving a second roller bearing; a brake support portion comprising a convex web member extending rearwardly and outwardly of said conical shaped member in a contiguous relation to said first annular shoulder and having a central opening concentric to said axial bore, a pair of diametrically opposite brake shoe flanges integrally formed on the forward surface of said convex web member and having their forward end faces lying in planes that are perpendicular to the axial bore's axis; and a steering knuckle portion comprising a pair of radial arm support members extending rearwardly from the rear surface of said convex web member, each of said arm support members provided with a radially extending opening contiguous to said rear surface of said web member for seating a kingpin bearing therein, and each of said arm support members terminating with an end collar having an aperture for receiving a steering linkage rod.

2. The combination as defined in claim 1, wherein said brake support portion comprises an opening in one of said flanges extending through said end face and having an axis generally parallel to said axial bore for receiving a cam shaft therein.

3. The combination as defined in claim 2, wherein said brake support portion further comprises an aperture provided in said end face of said other flanges for mounting the brake shoes' pivot pin.

4. The combination as defined in claim 2, wherein said brake support portion further comprises a pair of spaced bosses formed on said outer surface of said convex shaped member adjacent to said one flange for securing one end of a pair of brake shoe tension springs.

5. The combination as defined in claim 4, further comprising a second pair of spaced bosses formed on said outer surface of said convex shaped member adjacent to said outer edge and between said flanges and an opening provided therebetween for attaching a brake shoe hold down spring device.

* * * * *